(12) United States Patent
Smith et al.

(10) Patent No.: US 11,130,582 B2
(45) Date of Patent: Sep. 28, 2021

(54) SYSTEMS AND METHODS OF OPTIMIZING COOLING AND PROVIDING USEFUL HEATING FROM SINGLE PHASE AND TWO PHASE HEAT MANAGEMENT IN PROPULSION SYSTEMS

(71) Applicants: Rolls-Royce Corporation, Indianapolis, IN (US); Rolls-Royce North American Technologies Inc., Indianapolis, IN (US)

(72) Inventors: Alan Smith, Greenwood, IN (US); Paul O'Meallie, Brownsburg, IN (US)

(73) Assignees: ROLLS-ROYCE CORPORATION, Indianapolis, IN (US); ROLLS-ROYCE NORTH AMERICAN TECHNOLOGIES INC., Indianapolis, IN (US)

( * ) Notice: Subject to any disclaimer, the term of this patent is extended or adjusted under 35 U.S.C. 154(b) by 221 days.

(21) Appl. No.: 16/054,779

(22) Filed: Aug. 3, 2018

(65) Prior Publication Data

US 2020/0039654 A1 Feb. 6, 2020

(51) Int. Cl.
*F02D 25/02* (2006.01)
*B64D 15/04* (2006.01)
*F02C 7/047* (2006.01)
*F01D 25/02* (2006.01)
(Continued)

(52) U.S. Cl.
CPC ............. *B64D 15/04* (2013.01); *B64D 33/02* (2013.01); *F01D 25/02* (2013.01); *F02C 7/047* (2013.01); *B64D 29/00* (2013.01); *B64D 2033/0233* (2013.01); *F05D 2260/213* (2013.01)

(58) Field of Classification Search
CPC .......... F01D 25/02; F01D 25/08; F01D 25/10; F01D 25/12; F01D 25/125; F01D 25/14; F01D 25/18; F02C 7/047; F02C 7/14; F02C 7/16; F02C 7/185; F02C 7/224; F05D 2260/20; F05D 2260/205; F05D 2260/207;
(Continued)

(56) References Cited

U.S. PATENT DOCUMENTS

| 3,749,336 A | 7/1973 | Christensen et al. |
| 3,933,327 A | 1/1976 | Cook et al. |
| 5,114,100 A | 5/1992 | Rudolph et al. |

(Continued)

OTHER PUBLICATIONS https://www.faa.gov/regulations_policies/handbooks_manuals/aircraft/amt_airframe_handbook/media/ama_Ch15.pdf Aviation Maintenance Technician Handbook—Airframe, vol. 2, Chapter 15, Ice and Rain Protection, 32pgs.

*Primary Examiner* — Todd E Manahan
*Assistant Examiner* — Sean V Meiller
(74) *Attorney, Agent, or Firm* — Crowell & Moring

(57) ABSTRACT

Systems and methods of heat management of turbine engines including turbofans, turboprops and turboshafts and fan driven propulsion systems. The propulsion system may comprise a fan, nacelle, an electrical or mechanical heat source and a cooling system consisting of heat exchangers in the fan duct and on the nacelle and coolant pumps. The heat source can be a motor or a generator or turbine machinery or accessories rotationally coupled to rotating shafts. The heat management system transfers heat to the air in the fan flow path to provide additional fan thrust. The heat management system also transfers heat to structural members in the gas flow path that require anti-icing.

15 Claims, 8 Drawing Sheets

(51) Int. Cl.
*B64D 33/02* (2006.01)
*B64D 29/00* (2006.01)

(58) Field of Classification Search
CPC ...... F05D 2260/213; B64D 2033/0233; B64D 2033/024; B64D 2027/026
See application file for complete search history.

(56) References Cited

U.S. PATENT DOCUMENTS

| | | | |
|---|---|---|---|
| 5,190,249 | A | 3/1993 | Whitmire et al. |
| 5,729,969 | A * | 3/1998 | Porte .................. F02C 6/08 60/226.1 |
| 5,782,077 | A * | 7/1998 | Porte .................. F02C 7/185 60/782 |
| 7,200,999 | B2 * | 4/2007 | Bagnall ............... F04D 29/526 60/785 |
| 7,377,098 | B2 * | 5/2008 | Walker ................. F01D 9/065 60/39.08 |
| 8,499,822 | B2 * | 8/2013 | Bulin .................. F02C 7/224 165/51 |
| 9,764,847 | B2 | 9/2017 | Wright |
| 10,196,932 | B2 * | 2/2019 | Sennoun ............... F01D 9/065 |
| 2010/0313591 | A1 | 12/2010 | Lents et al. |
| 2012/0298802 | A1 | 11/2012 | Todorovic |
| 2013/0195658 | A1 | 8/2013 | Saito et al. |
| 2016/0061056 | A1 * | 3/2016 | Appukuttan ........... F01D 9/02 415/144 |
| 2016/0160758 | A1 * | 6/2016 | Marchaj ............... F02K 3/06 60/779 |
| 2017/0292412 | A1 * | 10/2017 | Fonseca ............... F01D 15/005 |
| 2017/0292531 | A1 | 10/2017 | Snyder |
| 2018/0087392 | A1 * | 3/2018 | Chalaud ............... F01D 9/02 |

* cited by examiner

SYSTEMS AND METHODS OF OPTIMIZING COOLING AND PROVIDING USEFUL HEATING FROM SINGLE PHASE AND TWO PHASE HEAT MANAGEMENT IN PROPULSION SYSTEMS

BACKGROUND

Support systems in rotating machinery are frequently used to remove heat from the machinery. For example, oil systems in propulsion systems—such as turbine engines or fan propulsion units—circulate oil to rotating components to both lubricate and cool those components as they rotate and generate heat from friction with other components. The oil is used to safely transfer the heat to a heat sink (such as the atmosphere), thus preventing overheating of essential engine components.

There is a need in the art of propulsion systems for more effective and more efficient means of heat removal. One reason for this need is the development of larger rotating machines and/or components of turbofan engines, such as motors, generators, and gearboxes, that generate larger heat loads than previously seen in the art. To address these growing heat loads, improvements are needed.

SUMMARY

According to some aspects of the present disclosure, an anti-icing system of a propulsion unit comprises a rotatable shaft, an electric machine, a static nacelle, and a heat management system. The rotatable shaft defines an axis of rotation. The electric machine is coupled to the rotatable shaft. The static nacelle is positioned radially outward of and extends axially along at least a portion of the axis; the nacelle has an inlet leading edge and defines an interior nacelle cavity. The heat management system comprises a heat exchanger positioned at the inlet leading edge of the nacelle and a fluid flowpath for conveying a fluid. The fluid flowpath extends proximate the electric machine to the heat exchanger.

In some embodiments the fluid flowpath is positioned to effect heat transfer from the electric machine to the fluid and from the fluid to air flowing around the leading edge of the nacelle inlet. In some embodiments the anti-icing system further comprises a static casing and a first radially extending member. The static casing is positioned radially outward of the shaft, and at least partially defines a radially interior cavity. The first radially extending member is positioned along the axis and extends radially between the static casing and the nacelle. The first member defines an interior first member cavity. The fluid flowpath extends from the radially interior cavity to the nacelle cavity via the interior first member cavity.

In some embodiments the fluid flowpath further comprises a first member heat exchanger disposed in the first member cavity to effect heat transfer from the fluid to air flowing around the first member. In some embodiments the anti-icing system further comprises a diverter valve positioned in the fluid flowpath, the diverter valve being adjustable to direct more or less of the fluid to the heat exchanger. In some embodiments the electric machine is positioned in the radially interior cavity. In some embodiments the electric machine is positioned in the nacelle cavity and coupled to the rotatable shaft via a gearbox.

In some embodiments the fluid conveyed in the fluid flowpath is a two-phase coolant. In some embodiments the anti-icing system further comprises a restrictor valve positioned in the fluid flowpath, the restrictor valve being adjustable to raise or lower a pressure of the fluid conveyed by the fluid flowpath.

According to aspects of the present disclosure, a propulsion system comprises a rotatable shaft, a static casing, a fan, a static nacelle, a static flow splitter, a first radially extending member, a second radially extending member, and a heat management system. The rotatable shaft defines an axis of rotation. The static casing is positioned radially outward of the shaft and at least partially defines a radially interior cavity. The fan is coupled to the rotatable shaft. The static nacelle is positioned radially outward of the fan and extends axially along at least a portion of the axis. The nacelle defines an interior nacelle cavity and has a nacelle inlet leading edge. The static flow splitter is positioned radially intermediate of at least a portion of the nacelle and the shaft. The first radially extending member is positioned along the axis and extends radially between the flow splitter and the nacelle, and the first member defines an interior first member cavity. The second radially extending member is positioned along the axis and extends radially between the casing and the flow splitter, and the second member defines a second member cavity. The heat management system comprises a fluid flowpath for conveying a fluid. The fluid flowpath extends from the radially interior cavity to the nacelle cavity via the first member cavity and the second member cavity.

In some embodiments the propulsion system further comprises a second radially extending member axially aligned with and circumferentially spaced from the first radially extending member, the second member defining a second member cavity. The fluid flowpath extends from the nacelle cavity to the radially interior cavity via the second member cavity. In some embodiments said fluid flowpath further comprises a heat exchanger positioned in the second member cavity to effect heat transfer from the fluid to air flowing around the second member. In some embodiments said fluid flowpath further comprises a heat exchanger disposed in the second member cavity to effect heat transfer from the fluid to air flowing around the second member.

In some embodiments the propulsion system further comprises a bypass conduit coupled to the fluid flowpath to bypass the heat exchanger disposed in the second member cavity, wherein said flow through the bypass conduit is controlled by a bypass control valve positioned in the bypass conduit. In some embodiments the propulsion system further comprises a diverter valve for controlling the flow of the fluid to the heat exchanger disposed in the second member cavity. In some embodiments the propulsion system further comprises a pump disposed in the fluid flowpath. In some embodiments the fluid flowpath further comprises a heat exchanger positioned at the nacelle inlet leading edge to effect heat transfer from the fluid to air flowing around the nacelle inlet leading edge.

In some embodiments the propulsion system further comprises a diverter valve in the fluid flowpath, the diverter valve adjustable to control the flow rate of the fluid flowing to the heat exchanger positioned at the nacelle inlet leading edge by diverting the fluid into a first stream to the heat exchanger and a second stream that bypasses the heat exchanger.

In some embodiments the propulsion system further comprises a merge pipe junction in the fluid flowpath, said first stream and said second stream merging at the merge pipe junction. In some embodiments the merge pipe junction comprises an ejector.

In some embodiments the fluid conveyed in the fluid flowpath is a two-phase coolant. In some embodiments the propulsion system further comprises a restrictor valve positioned in the fluid flowpath, the restrictor valve being adjustable to raise or lower a pressure of the fluid conveyed by the fluid flowpath.

According to aspects of the present disclosure, a method of heat management is presented. A propulsion unit has a radially extending first member extending through a fan flowpath and defining a first member cavity, a nacelle defining a nacelle cavity and having a heat exchanger disposed at the nacelle inlet leading edge, and a fluid flowpath for conveying a fluid. A method of heat management in the propulsion unit comprises passing the fluid in a radially outward direction through the first member cavity to effect heat transfer from the fluid to air passing over the first member; and passing the fluid to the heat exchanger disposed at the nacelle inlet leading edge to effect heat transfer from the fluid to air passing around the nacelle inlet leading edge.

In some embodiments the propulsion unit further comprises a heat source. In some embodiments the method further comprises passing the fluid proximate the heat source to effect heat transfer from the heat source to the fluid.

In some embodiments the method further comprises regulating the flow of fluid through the heat exchanger disposed at the nacelle inlet leading edge to effect de-icing of the nacelle inlet leading edge.

In some embodiments the method further comprises splitting the fluid flow into a first stream that passes through the heat exchanger and a second stream; and merging the first stream and second stream downstream of the heat exchanger via an ejector.

BRIEF DESCRIPTION OF THE DRAWINGS

The following will be apparent from elements of the figures, which are provided for illustrative purposes.

Figure 1:
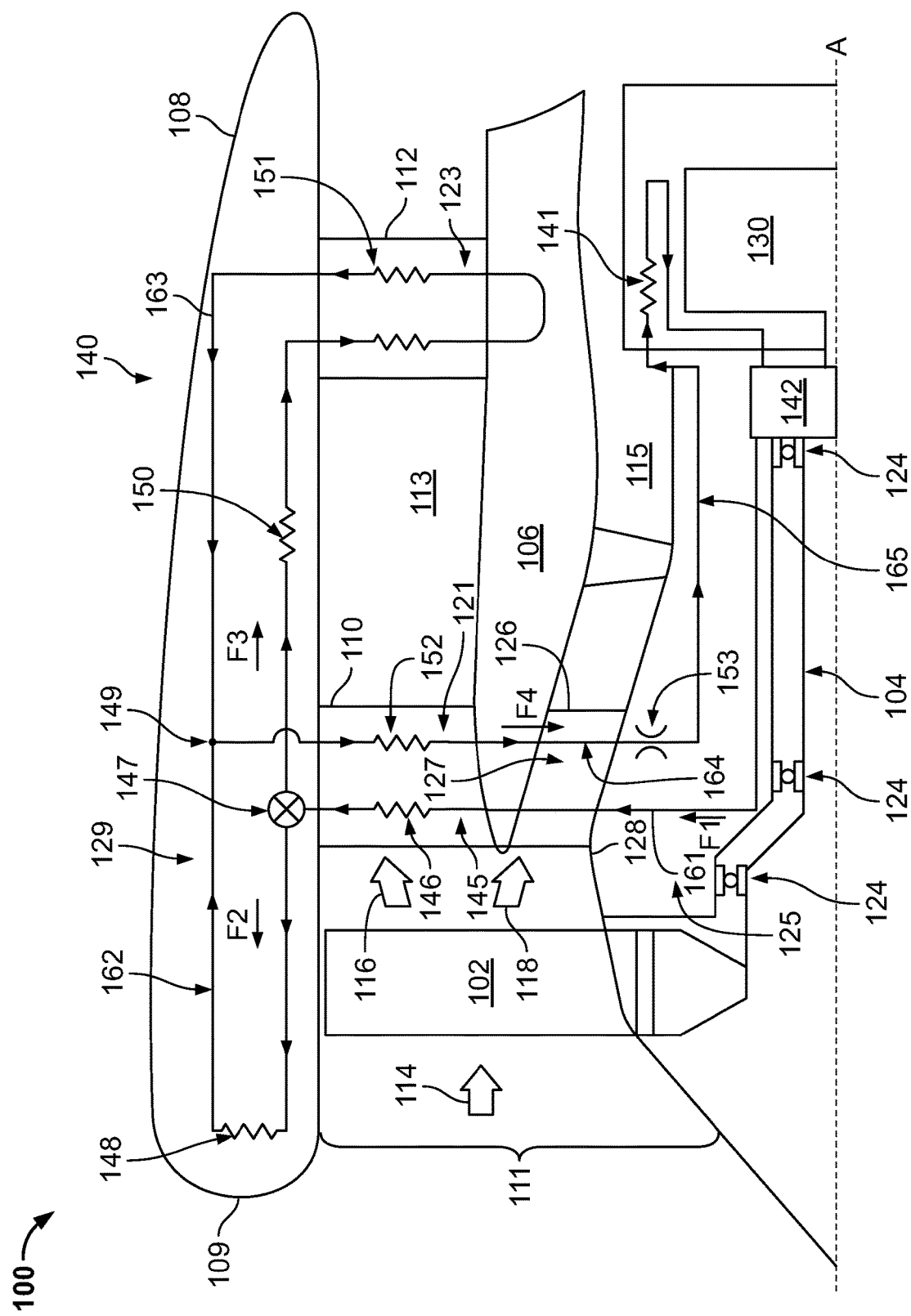
FIG. 1 is a simplified and schematic cross-sectional view of a portion of a propulsion unit in accordance with some embodiments of the present disclosure.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

For the purposes of promoting an understanding of the principles of the disclosure, reference will now be made to a number of illustrative embodiments in the drawings and specific language will be used to describe the same.

The present disclosure is directed to improvements in cooling components of propulsion systems. More specifically, the present disclosure is directed to a system for cooling a fluid that receives heat from the rotating machine, the system including fluid flowpaths through non-rotating structures of the machine. In some embodiments, the present disclosure is directed to a system of cooling fluid that includes first and second non-rotating members spaced axially apart from each other along an axis of the rotating machine, with fluid flowpaths defined through the first and second members to effect heat transfer from the fluid to air flowing over the members.

Nacelle or inlet gas flow path surfaces and aerodynamic and supporting struts in the flow path provide good surface heat transfer to the gas flow path especially at the leading edges. These surfaces should be used to provide cooling surfaces in preference to incorporating heat exchangers that add additional drag. The leading edges surface in front of rotating turbomachinery typically require anti-ice heating in aircraft and hovercraft. Transferring heat to the gas flow path provides the benefit that by heating up the air the energy can be recovered by generating more thrust at the nozzles. However heating air in the core gas turbine flow path will have the disadvantage of raising the turbine inlet temperature which is a disadvantage on hot days when the engine is turbine temperature is limited.

FIG. 1 is a simplified and schematic cross-sectional view of a portion of a fan propulsion system or turbofan engine 100 in accordance with some embodiments of the present disclosure. The turbofan engine 100 comprises a fan 102 coupled to a rotatable shaft 104 that defines an axis A of the engine 100. The axis A may be the axis of rotation of the engine 100. Airflow into the turbofan engine 100, represented by arrow 114, flows from left to right in the illustration. Downstream from the fan 102 is a flow splitter 106 that divides the airflow into a bypass flow represented by arrow 116 and a core flow represented by arrow 118.

The bypass flow 116 passes around a first member 110 at a first axial position along the axis of rotation A and then around a downstream member 112 at a second axial position. The core flow 118 passes around second member 126 and then through the core of the machine or turbomachine comprising a compressor, combustor, and turbine (not shown), or an electric motor.

The shaft 104 may have one or more bearings 124 and/or seals for structural support and sealing between the shaft 104 and radially outward components.

A static casing 128 is positioned radially outward of the shaft 104 and may form the radially inner boundary of the core flow 118. The static casing at least partially defines a radially interior cavity 125.

A static nacelle 108 encases at least a portion of the propulsion system or turbofan engine 100. The nacelle 108 may be positioned radially outward of the fan 102, and may extend axially along at least a portion of the axis A. The nacelle 108 defines an interior nacelle cavity 129.

The static flow splitter 106 is positioned radially intermediate of at least a portion of the nacelle 108 and the shaft 104.

The airflow 114 into the fan 102 is bound in a radially outward direction by the nacelle 108. This region of airflow 114 may be referred to as the inlet region or inlet flowpath 111. The inlet flowpath 111 is disposed axially forward of fan 102, which is axially forward of the first member 110.

The bypass flow 116 passes through a bypass flowpath 113 at least partially defined between the nacelle 108 and flow splitter 106. The core flow 118 passes through a core flowpath 115 at least partially defined between the flow splitter 106 and casing 128. The bypass flowpath 113 and core flowpath 115 are each disposed downstream from the inlet flowpath 111.

A radially extending first member 110 is illustrated at a first axial position along the axis A. The first member 110 may be one of a plurality of vanes spaced circumferentially about the axis A. The first member defines an interior first member cavity 121. The first member 110 may extend from the flow splitter 106 to the nacelle 108, and may be the outlet guide vanes of fan 102 or a fan strut. The first member 110 is disposed downstream of inlet region 111.

A radially extending downstream member 112 is illustrated at a second axial position along the axis A. The downstream member 112 may be one of a plurality of vanes spaced circumferentially about the axis A. The downstream member defines an interior downstream member cavity 123. The downstream member 112 may extend from the flow splitter 106 to the nacelle 108, and may be a support strut or exhaust vane. The downstream member 112 is disposed downstream of inlet region 111 and first member 110.

In some embodiments, radially extending second member 126 second member 126 is positioned along the axis A and extends radially between the casing 128 and the flow splitter 106. The second member 126 may define an interior second member cavity 127. The second member 126 may be a core inlet strut, compressor inlet strut or guide vane, or similar structure.

In the illustrated embodiment of FIG. 1, a heat source 130 may be disposed proximate the axis A. The heat source 130 may be positioned within the radially interior cavity 125. The heat source 130 may be, for example, a rotor, motor components, a pump, a gearbox, a generator, and/or an electric machine.

A heat management system 140 is provided to remove heat from the heat source 130. The heat management system 140 comprises a fluid flowpath 145 for conveying a fluid. In some embodiments, the fluid flowpath 145 extends from the first member cavity 121 to the nacelle cavity 129 and to the downstream member cavity 123. The fluid flowpath 145 may extend from the radially interior cavity 125 to the second member cavity 127 to the first member cavity 121.

The heat management system 140 may further comprise a pump 142 and a heat exchanger 141, and each may be disposed in the radially interior cavity 125. In some embodiments the pump 142 may be mechanically driven by the shaft 104 via a gearbox (not shown). The pump 142 may be otherwise mechanically driven or electrically driven.

The fluid flowing through the fluid flowpath 145 may be a cooling fluid. The cooling fluid may be a gas, a liquid, or a two-phase coolant. The cooling fluid may be oil, a lubricant, a glycol-based solution, refrigerant, fuel, or hydraulic fluid. In a two-phase coolant system, the phase change from liquid to gas allows the coolant to absorb additional heat while the subsequent phase change from gas to liquid allows the coolant to expel additional heat as compared to a single phase system due to the latent heat of vaporization.

The fluid circulating through the fluid flowpath 145 conveys heat away from the heat source 130. More specifically, the fluid conveys heat from the heat source 130 to air flowing around the nacelle 108, first member 110, and/or downstream member 112 and/or second member 126.

In some embodiments, the heat management system 140 further comprises a diverter valve 147 and a merge pipe junction 149. One or both of the diverter valve 147 and merge pipe junction 149 may be disposed in the nacelle cavity 129. In some embodiments, one or both of the diverter valve 147 and/or merge pipe junction 149 may be disposed in the flow splitter 106, the radially interior cavity 125, or another portion of the propulsion unit 100.

The fluid flowpath 145 may comprise a plurality of passages in fluid communication with each other. A first passage 161 may extend from the radially interior cavity 125 through the first member cavity 121 to the diverter valve 147. A portion of the first passage 161 may also extend through the second member cavity 127. The first passage may include or be in fluid communication with a first member outbound heat exchanger 146 and/or a second member outbound heat exchanger.

A second passage 162 may extend from the diverter valve 147 through the nacelle cavity 129 and to the merge pipe junction 149. The second passage 162 may include or be in fluid communication with a heat exchanger 148 at the nacelle inlet leading edge 109. The heat exchanger 148 may extend fully around the circumference of the nacelle inlet leading edge 109, or may be formed in discrete circumferential portions about the nacelle inlet leading edge 109.

A third passage 163 may extend from the diverter valve 147 through the nacelle cavity 129, through the downstream member cavity 123 to the merge pipe junction 149. The third passage 163 may include or be in fluid communication with downstream member heat exchanger 151.

A fourth passage 164 may extend from the merge pipe junction 149 to the radially interior cavity 125. The fourth passage 164 may pass through the first member cavity 121 and second member cavity 127. The fourth passage 164 may include or be in fluid communication with a first member inbound heat exchanger 152 and/or a second member inbound heat exchanger (not shown).

A fifth passage 165 may extend within the radially interior cavity 125 and pass through a heat exchanger 141 to effect heat transfer to the fluid of the fluid flowpath 145. The heat may be transferred from heat source 130. The fifth passage may include or be in fluid communication with a pump 142. The fifth passage may be coupled between the first passage 161 and the fourth passage 164.

The diverter valve 147 may proportion flow between the second passage 162 and third passage 163. The flow between second passage 162 and third passage 163 may be proportioned based on a degree of de-icing required at the nacelle inlet leading edge 109.

In operation, fluid discharged from pump 142 flows in a radially outward direction through first member cavity 121 as indicated by arrow F1. A first member outbound heat exchanger 146 may be disposed within first member cavity 121. As fluid passes through the first member outbound heat exchanger 146, heat may be transferred to bypass flow 116 flowing around first member 110. Prior to flowing through first member cavity 121, the fluid discharged from pump 142 may flow in a radially outward direction through second member cavity 127 and flow splitter 106.

In some embodiments, fluid exiting the first member outbound heat exchanger 146 and/or first member cavity 121 is then split by a diverter valve 147 into a first stream indicated by arrow F2 and second stream indicated by arrow F3. The first stream F2 may proceed in an axially forward direction to the nacelle inlet leading edge 109. The nacelle inlet leading edge 109 may be the axially forwardmost portion of the nacelle 108. The first stream F2 may pass through a heat exchanger 148 of the nacelle inlet leading edge 109 that may effect de-icing of the nacelle inlet leading edge 109. In some embodiments the first stream F2 may pass proximate an axially forward surface of the nacelle 108 to effect de-icing of the nacelle 108. The first stream F2 may exit the heat exchanger 148 of the nacelle inlet leading edge 109 and proceed to merge pipe junction 149 where first stream F2 is merged with second stream F3.

Downstream of the diverter valve 147, the second stream F3 may pass through a fan duct surface heat exchanger 150. The fan duct surface heat exchanger 150 may be positioned within the nacelle cavity 129. The fan duct surface heat exchanger 150 may be a surface heat exchanger disposed on the radially inner surface of the nacelle 108. As fluid passes through the fan duct surface heat exchanger 150, heat may be transferred to bypass flow 116 flowing around and through the nacelle 108.

The second stream F3 may pass through downstream member cavity 123. As shown in FIG. 1, the second stream F3 may pass in a radially inward direction through downstream member cavity 123 before returning to the nacelle 108 by passing in a radially outward direction through downstream member cavity 123. In other embodiments, the fluid may pass only in a radially inward direction through the downstream member cavity 123. When passing in either or both of a radially inward and radially outward directions, the fluid of second stream F3 may pass through a downstream member heat exchanger 151. As fluid passes through the downstream member heat exchanger 151, heat may be transferred to bypass flow 116 flowing around and through the downstream member 112.

The second stream F3 may then pass through the merge pipe junction 149 and merged with first stream F2. The merge pipe junction 149 may be disposed axially forward of the downstream member 112. The merged stream, indicated by arrow F4, comprises the fluid of first stream F2 and second stream F3. The merged stream F4 may pass in a radially inward direction through the first member cavity 121. A first member inbound heat exchanger 152 may be disposed within first member cavity 121. As fluid passes through the first member inbound heat exchanger 152, heat may be transferred to bypass flow 116 flowing around first member 110. After passing in a radially inward direction through the first member cavity 121, the cooling fluid may pass through flow splitter 106 and second member cavity 127.

In some embodiments an orifice 153 is disposed downstream of one or more of the first member inbound heat exchanger 152, flow splitter 106, and second member cavity 127 to improve pressure control within the heat management system 140. After passing in a radially inward direction through first member cavity 121, the fluid may flow to a heat exchanger 141 positioned within the radially interior cavity 125. The first heat exchanger 141 may be disposed proximate the heat source 130 to facilitate the transfer of heat from the heat source 130 to the fluid. The first heat exchanger 141 may be integrally formed with the heat source 130. The fluid may exit the first heat exchanger 141 and pass to the inlet of the pump 142.

In some embodiments the diverter valve 147 is adjustable to permit changes in the proportion of fluid sent to first stream F2 and second stream F3. Adjustments may be made to achieve a desired degree of de-icing of the nacelle and/or inlet flowpath 111. For example, in non-icing conditions with large total heat flow, the diverter valve 147 may be adjusted to send most of the fluid flow to second stream F3. In moderately icing conditions, the diverter valve 147 may be adjusted to send a larger portion of the fluid to first stream F2 to effect de-icing, while in heavily icing conditions with low total heat flow the diverter valve 147 may be adjusted to send all or substantially all of the fluid to first stream F2. The diverter valve 147 may also be adjusted to permit changes in the degree of cooling achieved by the heat management system 140.

Thus the present disclosure provides a system of cooling a heat source 130 in a turbofan engine 100. Heat from the heat source 130 is transferred to a fluid flowing in a fluid flowpath 145, and the fluid is passed through a first member cavity 121 and a downstream member cavity 123. First member 110 is axially spaced from downstream member 112. In passing the fluid through first member cavity 121 and downstream member cavity 123, heat is transferred from the cooling fluid to the air flowing around and through the nacelle 108, first member 110, and/or downstream member 112. Heat exchangers to facilitate the transfer of heat from the fluid to the air may be disposed on or in the nacelle 108, first member 110, and/or downstream member 112. In some embodiments the fluid may also be passed through a nacelle inlet leading edge 109 for additional heat rejection and also de-icing purposes.

Figure 2:
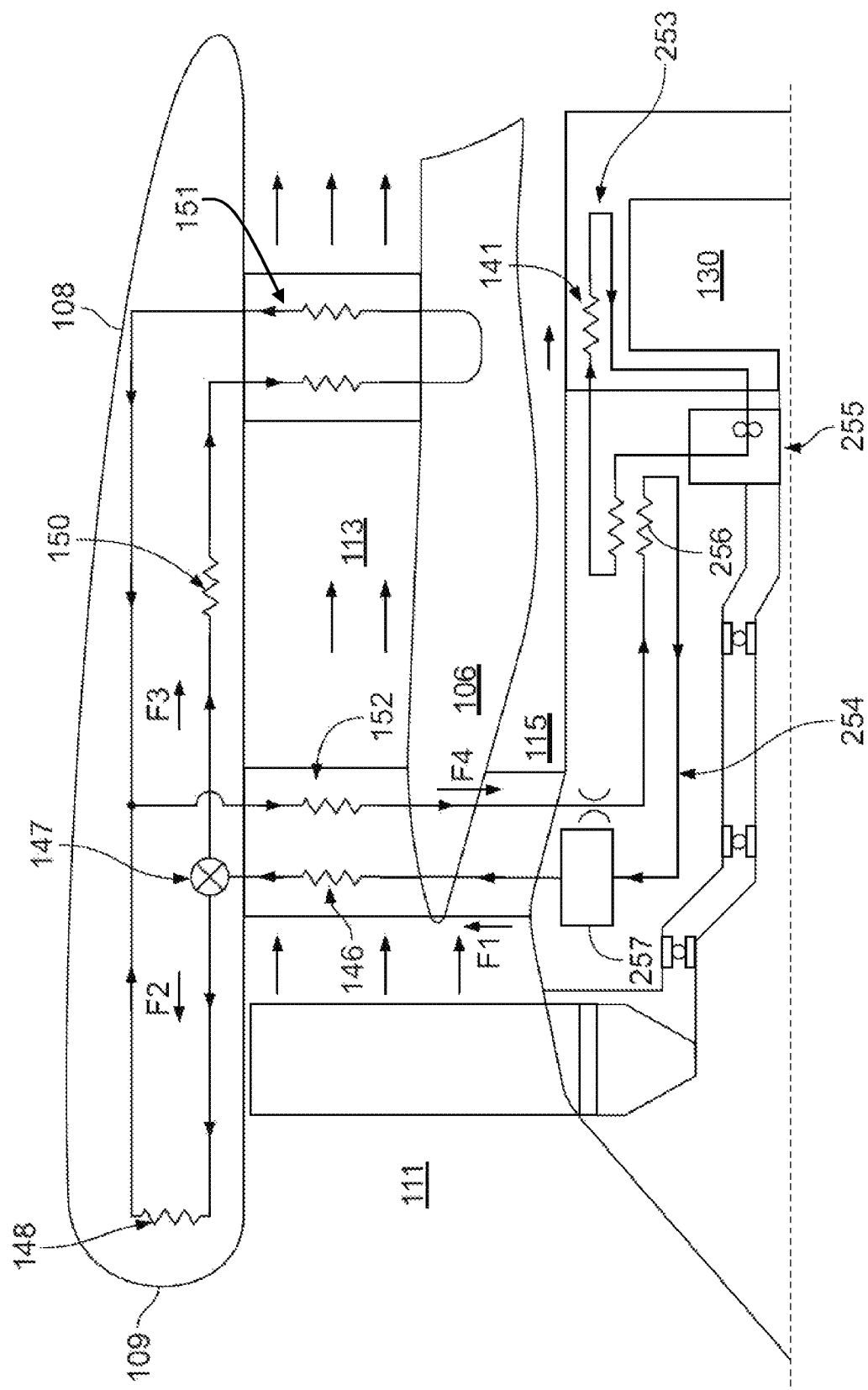
FIG. 2 is a simplified and schematic cross-sectional view of a portion of a propulsion unit in accordance with some embodiments of the present disclosure.

In some embodiments the heat management system 140 may be split into a primary loop 253 and secondary loop 254. This arrangement may be beneficial as the use of a secondary fluid may prevent the passing of a flammable fluid (such as oil) through first member cavity 121, downstream member cavity 123, and nacelle cavity 129. This arrangement additionally allows different fluids to be used in the nacelle cavity 129 than heat source 130, thus reducing system weight and/or allowing for the use of different pressures between the primary and secondary cooling systems. FIG. 2 is a simplified schematic diagram of such an embodiment.

The primary loop 253 comprises the first heat exchanger 141 disposed proximate the heat source 130, a primary loop pump 255, and a primary-secondary heat exchanger 256. A primary fluid passes through the first heat exchanger 141 to receive heat from the heat source 130, then passes through primary loop pump 255 and into the primary-secondary heat exchanger 256 where heat is transferred to a secondary fluid passing through the secondary loop 254. The primary-secondary heat exchanger 256 may be positioned within the radially interior cavity 125 and may be disposed radially inward of one or both of first member 110 and downstream member 112 or in the nacelle cavity 129.

The secondary loop 254 may comprise a secondary loop pump 257 in fluid communication with the secondary side of the primary-secondary heat exchanger 256. The secondary loop 254 may further comprise components of the heat management system 140 substantially as described above, to include first member outbound heat exchanger 146, diverter valve 147, heat exchanger 148, merge pipe junction 149, fan duct surface heat exchanger 150, downstream member heat exchanger 151, and first member inbound heat exchanger 152.

Figure 3:
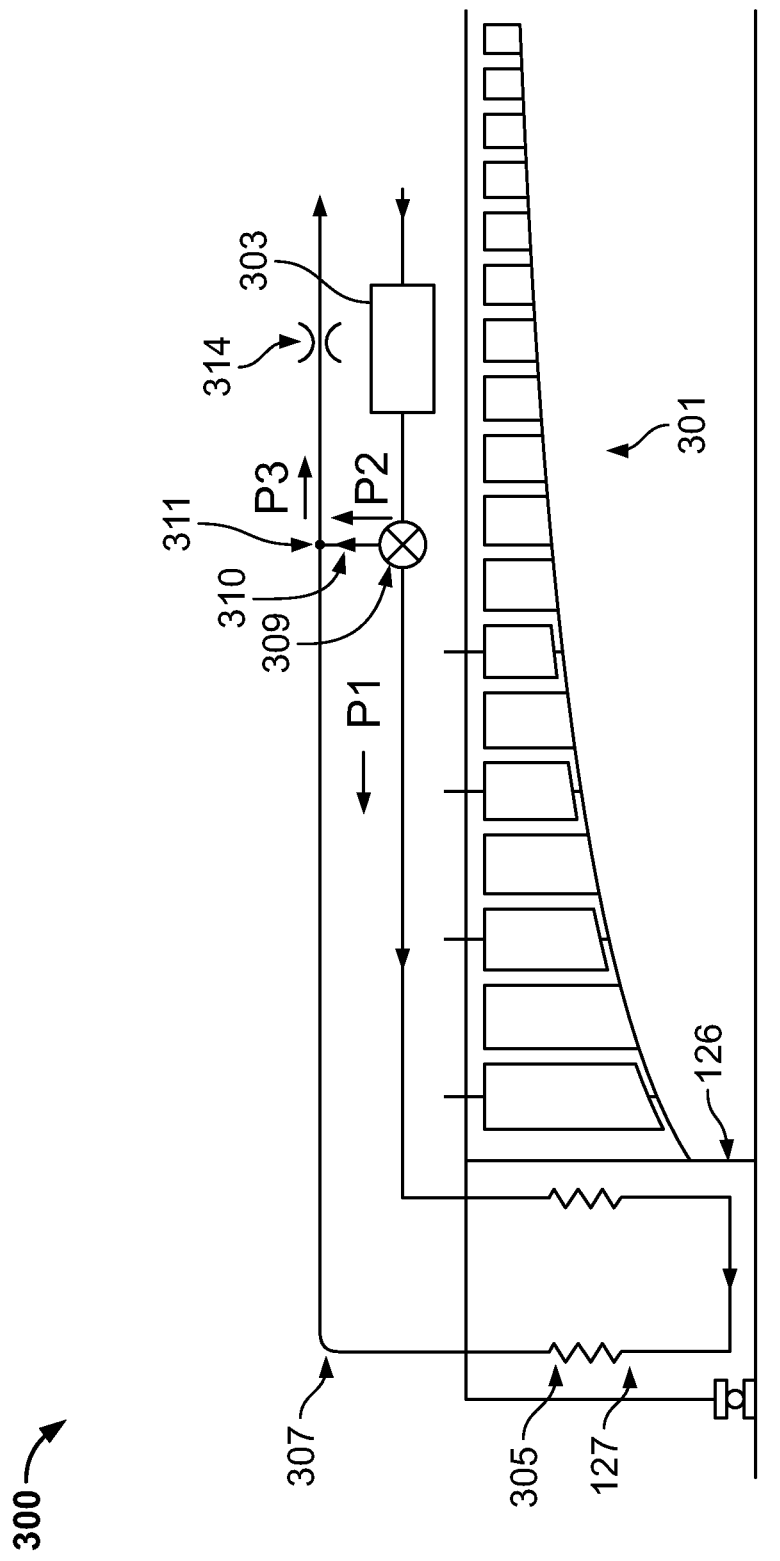
FIG. 3 is a simplified and schematic cross-sectional view of a portion of a propulsion unit in accordance with some embodiments of the present disclosure.

In some embodiments of the present disclosure, a system 300 is provided for de-icing the inlet strut or inlet guide vane of a compressor 301 in a turbofan engine. The second member 126 may be an inlet strut or inlet guide vane. FIG. 3 is a simplified schematic diagram of such a system 300. The system 300 may be in fluid communication with the heat management system 140 disclosed above, or may be a separate system. In other words, FIG. 3 may be viewed as providing additional detail to the heat management system 140 shown in FIG. 1 and/or FIG. 2, or may be viewed as disclosing an entirely separate system.

The system 300 may comprise a fluid flowpath 307 for conveying a fluid. The fluid flowpath 307 may be in fluid communication with a pump 303 and second member heat exchanger 305. Prior to passing through pump 303, the fluid may pass through a heat exchanger proximate a heat source, substantially as described above.

Upon discharge from pump 303, the fluid may be split by a diverter valve 309 into a first portion P1 and a second portion P2. The first portion P1 may flow through second member heat exchanger 305, disposed within second member cavity 127. The second member 126 may be an inlet strut, inlet guide vane, or similar support structure. Fluid passing through the second member heat exchanger 305 transfers heat to air passing around the second member 126, and provides de-icing to the second member 126.

Second portion P2 is routed via a bypass line 310 to a merge pipe junction 311. First portion P1 returning from the second member heat exchanger 305 is merged with second portion P2 at merge pipe junction 311, and is returned toward the heat exchanger proximate the heat source as indicated by arrow P3. In some embodiments an orifice 314 is disposed in the return line.

Diverter valve 309 allows for throttling of flow of cooling fluid to the second member heat exchanger 305 to meet the de-icing needs of the engine. In non-icing or low icing conditions, none or little flow may be directed to the second member heat exchanger 305, whereas in heavy icing conditions substantially all flow may be directed to the second member heat exchanger 305. By proportioning flow to the first portion P1 or second portion P2, the diverter valve 309 is able to meet various de-icing needs and, in some embodiments, may also be throttled to meet the heat transfer needs of the heat management system.

The system 300 may also be part of a larger system, as an example system 100 as described in FIG. 1 where system 300 would represent one of the possible fluid paths in the heat management system and there is no dedicated pump 303 since a single pump is used for the entire combined system.

Figure 4:
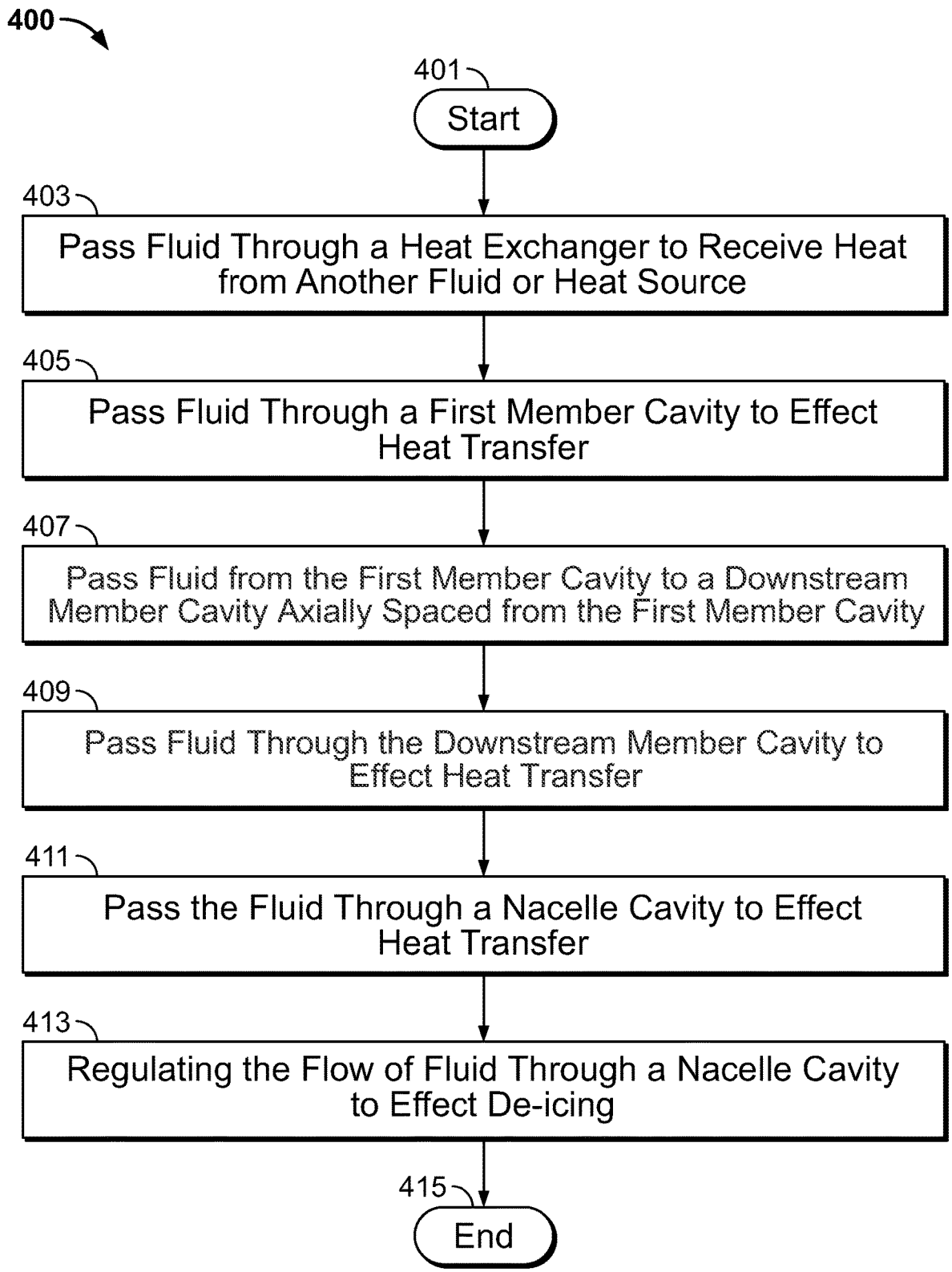
FIG. 4 is a flow diagram of a method in accordance with some embodiments of the present disclosure.

The present disclosure further provides methods of heat management in a propulsion system. FIG. 4 provides a flow diagram of one such method 400. Method 400 begins at Block 401.

At Block 403 a fluid is passed through a heat exchanger proximate a heat source such that heat is transferred from the heat source to the fluid. The heat may be transferred from another fluid to the cooling fluid. The heat source may be a heat source in a propulsion system such as for example, a rotor, motor components, a pump, a gearbox, a generator, and/or an electric machine.

The fluid is then moved from the heat exchanger to a first member cavity to effect heat transfer from the fluid to air flowing around the first member. This step is shown at Block 405. The first member may extend through a bypass flowpath of a turbofan engine, and may be an outlet guide vane of a fan.

At Block 407 the fluid is moved from a first member cavity to a downstream member cavity. The downstream member is axially spaced from the first member along the axis of the turbofan engine. The first member may be disposed at a first axial position and the downstream member may be disposed at a second axial position. The downstream member may be disposed downstream of the first member. Both the first member and the downstream member may be disposed axially downstream of the inlet region and fan of the propulsion system. The fluid may pass through a fan duct surface heat exchanger between the first member and downstream member.

The fluid is then passed through the downstream member cavity to effect heat transfer from the fluid to air flowing around the downstream member. This step is shown at Block 409. The downstream member may extend through a fan flowpath of a turbofan engine or through a fan or propeller flow path of a propulsion unit, and may be a support strut.

At Block 411, the fluid is optionally passed through a nacelle cavity to effect heat transfer from the fluid to air flowing around the nacelle. The fluid may be optionally divided between a first stream and second stream upon exiting the first member cavity, and only one of the first stream and second stream may be routed to a nacelle inlet leading edge. The other of the first stream and second stream may be moved to the downstream member cavity as described at Block 407.

At Block 413 the flow of fluid in the nacelle may be regulated to effect de-icing of outer surfaces of the nacelle. The fluid may be passed through a heat exchanger disposed at the nacelle inlet leading edge.

Method 400 ends at Block 415.

Figure 5:
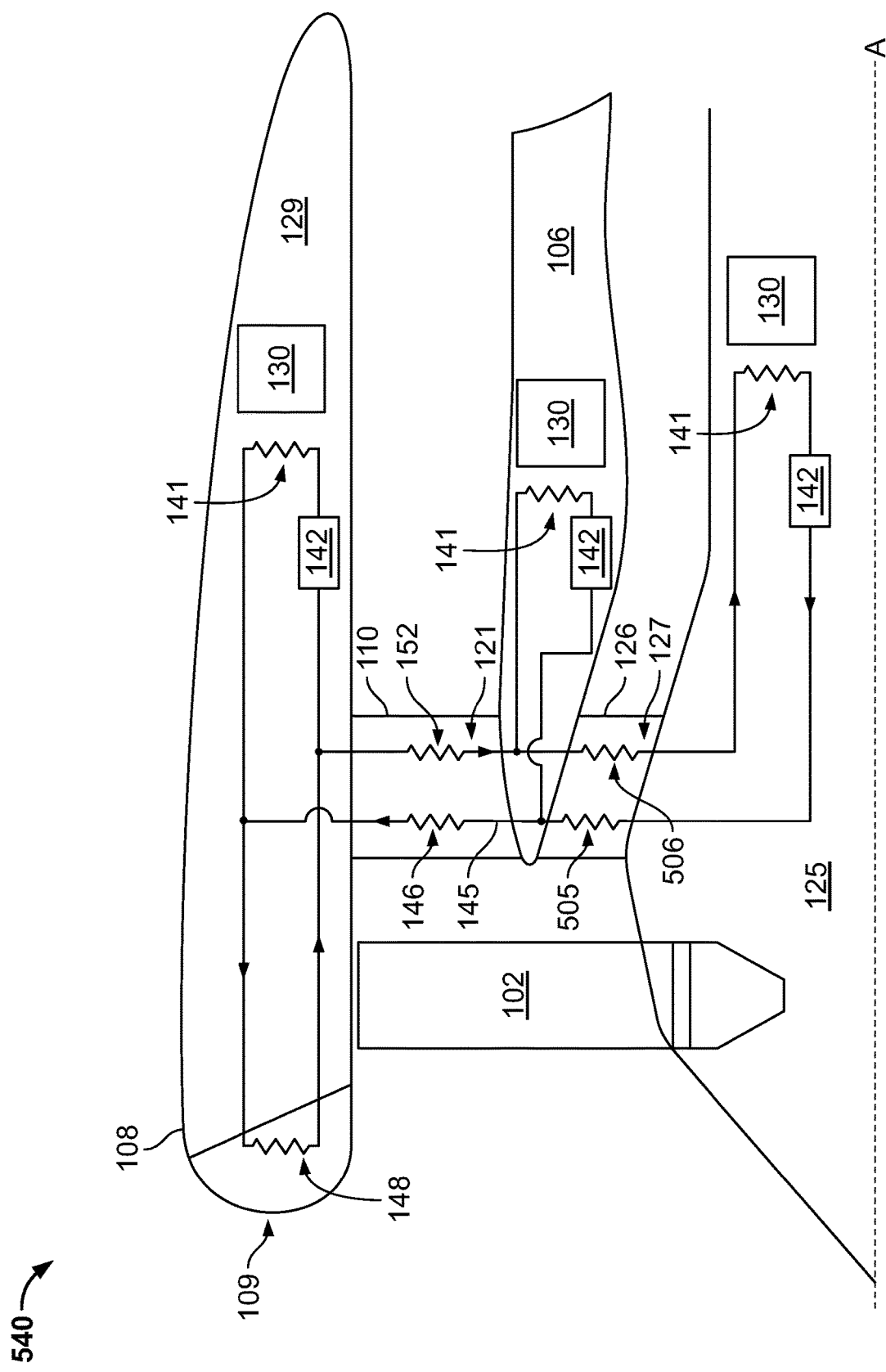
FIG. 5 is a simplified and schematic cross-sectional view of a portion of a propulsion unit in accordance with some embodiments of the present disclosure.

In some embodiments, one or more heat sources 130 may be positioned in the nacelle cavity 129, the flow splitter 106, the radially interior cavity 125, or some combination of these locations. FIG. 5 is a schematic view of the various potential positions of the heat source 130. Similarly, as shown in FIG. 5, one or more pumps 142 may be positioned in the nacelle cavity 129, the flow splitter 106, the radially interior cavity 125, or some combination of these locations. Each pump 142 and heat source 130 may be positioned in pairs (i.e. a pump 142 and heat source 130 positioned in the nacelle cavity 129), or may be positioned unpaired (i.e. a pump 142 positioned in the nacelle cavity 129 and a heat source positioned in the flow splitter 106).

As shown in FIG. 5, a fluid flowpath 145 may extend from a radially interior cavity 125 through second member cavity 127, flow splitter 106, first member cavity 121, and nacelle cavity 129. As in previous embodiments, a heat exchanger 148 may be positioned at or proximate the nacelle inlet leading edge 109. The heat exchanger 148 may extend fully around the circumference of the nacelle inlet leading edge 109, or may be formed in discrete circumferential portions about the nacelle inlet leading edge 109.

One or more heat exchangers may be positioned in the first member cavity 121 of first member 110. For example, the fluid flowpath 145 may comprise a first member outbound heat exchanger 146 and first member inbound heat exchanger 152, each positioned in the first member cavity. Similarly, one or more heat exchangers may be positioned in the second member cavity 127 of second member 126. For example, the fluid flowpath 145 may comprise a second member outbound heat exchanger 505 and a second member inbound heat exchanger 506. The second member outbound heat exchanger 505 and second member inbound heat exchanger 506 may be positioned or configured to effect anti-icing of the second member 126.

Further, as shown in FIG. 5, the diverter valve 147 discussed in previous embodiments may be removed from the heat management system 540.

In operation, the heat management system 540 of FIG. 5 circulates cooling fluid through fluid flowpath 145 to remove heat from one or more heat sources 130 and transfer the heat to air flowing about one or more heat exchangers 146, 148, 152, 505, 506. The cooling fluid is circulated by one or more pumps 142. Each of the one or more heat sources 130 may be, for example, a rotor, motor components, a pump, a gearbox, a generator, and/or an electric machine. The fluid flowpath 145 may comprise a heat exchanger proximate each of the one or more heat sources 130 to facilitate heat transfer away from those heat sources 130.

Figure 6:
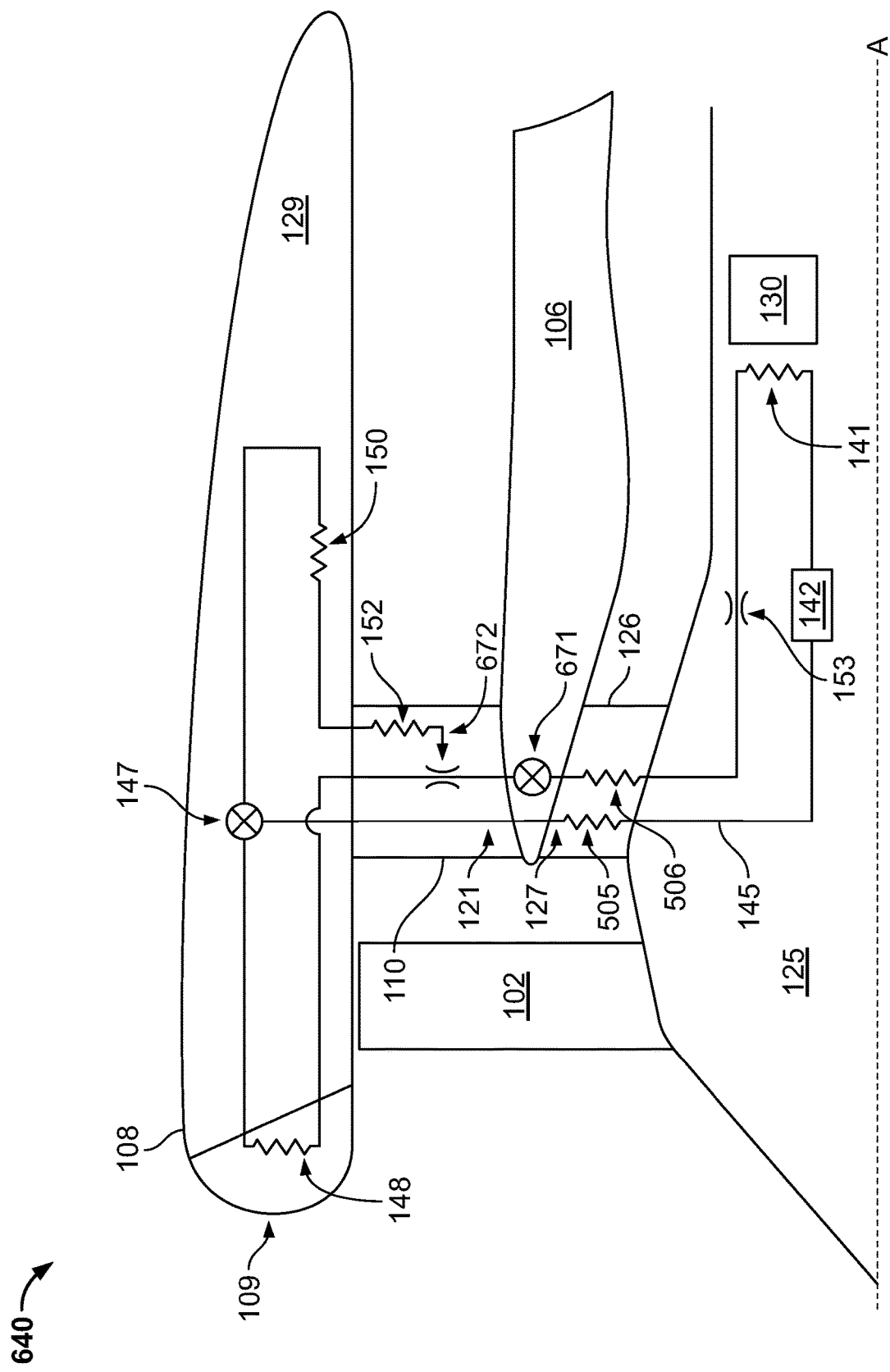
FIG. 6 is a simplified and schematic cross-sectional view of a portion of a propulsion unit in accordance with some embodiments of the present disclosure.

In some embodiments the fluid flowpath 145 may include a diverter valve 147, ejector 672, and/or restrictor valve 671. Such an embodiment is illustrated in FIG. 6. The fluid flowpath 145 may extend from the radially interior cavity 125 through the second member cavity 127, the flow splitter 106, the first member cavity 121, and the nacelle cavity 129. The fluid flowpath 145 begins in the radially interior cavity 125 and may include a heat exchanger disposed proximate a heat source 130 to facilitate transfer of heat from the heat source 130 to a cooling fluid of the fluid flowpath 145. A pump 142 may be positioned in the fluid flowpath 145 to circulate the cooling fluid.

The fluid flowpath may extend from the pump to a second member outbound heat exchanger 505, and then through the flow splitter 106 and first member 110 to the nacelle cavity 129. A diverter valve 147 may be positioned in the fluid flowpath 145 in the nacelle cavity 129 to control the flow of cooling fluid to a first stream passing through a heat exchanger 148 at the nacelle inlet leading edge 109 and to a second stream passing through a fan duct surface heat exchanger 150. The heat exchanger 148 may extend fully around the circumference of the nacelle inlet leading edge 109, or may be formed in discrete circumferential portions about the nacelle inlet leading edge 109. The first stream may be referred to as leading edge flow, and the second stream may be referred to as diverted flow or surface heat exchanger flow.

The first and second stream may be merged together via an ejector 672, which may be positioned in the first member cavity 121 as shown in FIG. 6, or alternatively in the flow splitter 106 or radially interior cavity 125. A first member inbound heat exchanger 152 may be positioned upstream of the ejector 672. Following the merger of the first and second streams, the fluid flowpath may proceed through the flow splitter 106 and second member cavity 127, and may pass through a second member inbound heat exchanger 506 en route to the radially interior cavity 125.

In some embodiments, a restrictor valve 671 is positioned in the fluid flowpath 145. The restrictor valve 671 is illustrated as positioned in the flow splitter 106, but may be positioned elsewhere in the fluid flowpath 145. In fluids having a refrigerant as a cooling fluid, the restrictor valve 671 may be used to increase temperatures in upstream heat exchangers, such as the heat exchanger 148 at the nacelle inlet leading edge 109 in order to increase the heat transfer from the cooling fluid in the heat exchanger 148 to air flowing about the nacelle inlet leading edge 109. When using a refrigerant as the cooling fluid the restrictor valve 671 can also be used to reduce the pressure in downstream heat exchanger 506 to disable or reduce the anti-ice heating in that heat exchanger 506 as required.

During operation, the diverter valve 147 may adjust the portion of cooling fluid flowing to a first stream passing through a heat exchanger 148 at the nacelle inlet leading edge 109 and to a second stream passing through a fan duct surface heat exchanger 150. In operating conditions requiring anti-icing at the nacelle inlet leading edge 109 and/or having low heat transfer requirements, a relatively large portion of the cooling fluid flow may be routed to the first stream by making adjustments to the diverter valve 147. In other operating conditions a relatively smaller portion of the cooling fluid flow may be routed to the first stream by making adjustments to the diverter valve 147.

Figure 7:
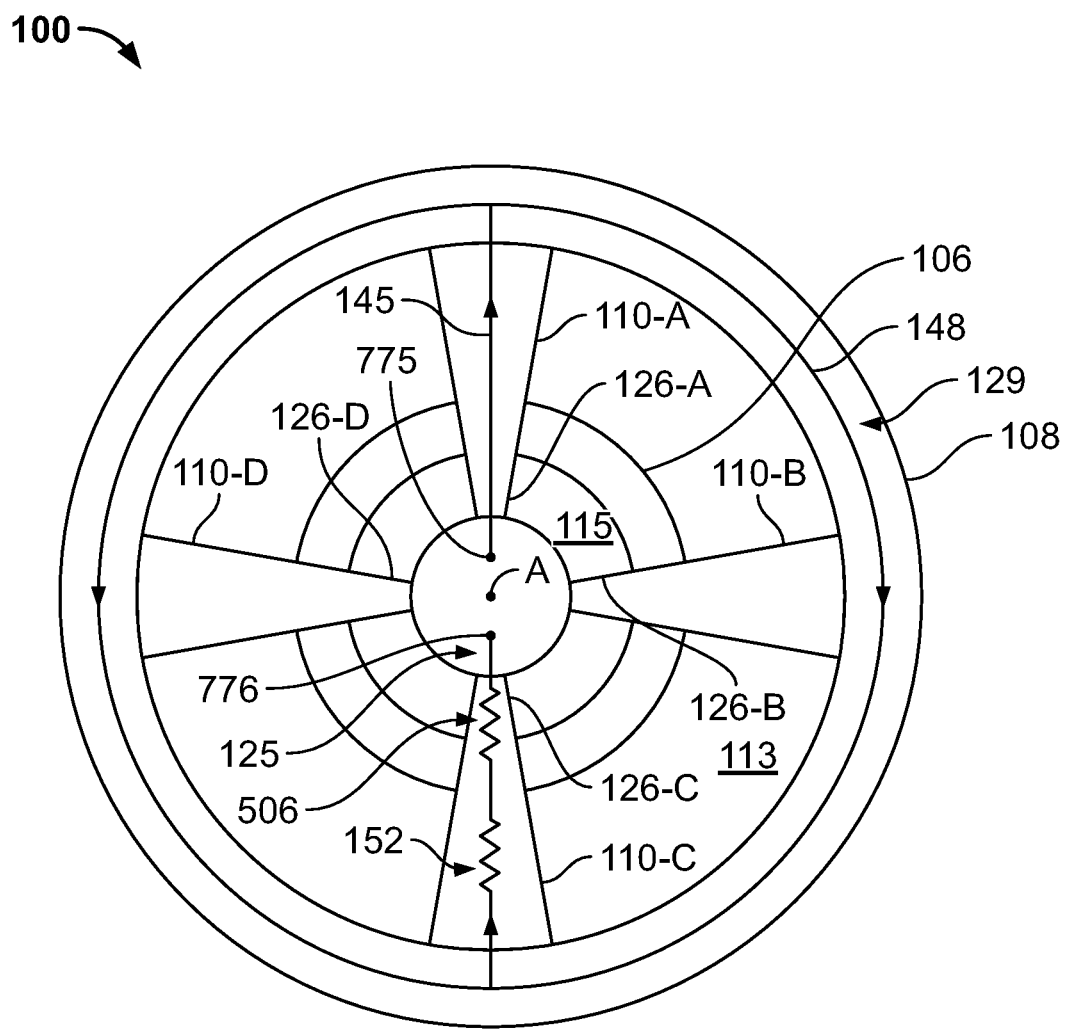
FIG. 7 is a simplified and schematic partial cross-sectional view of a portion of a propulsion unit, viewed forward to aft along an axis of the propulsion unit and with the fan removed for clarity, in accordance with some embodiments of the present disclosure.

FIG. 7 is a simplified and schematic partial cross-sectional view of a portion of a propulsion unit 100, viewed forward to aft along an axis A of the propulsion unit 100 and with the fan 102 removed for clarity, in accordance with some embodiments of the present disclosure. As shown when looking forward to aft along the axis A, the radially interior cavity 125 is positioned within the core flowpath 115, the flow splitter 106, the bypass flowpath 113 (or fan flowpath), and the nacelle 108. In this schematic view, the nacelle 108 is presented in a cross-sectional view taken proximate the nacelle inlet leading edge 109, while other illustrated components are presented in a cross-sectional view taken at an axial position consistent with the first member 110.

Viewed forward to aft along the axis A, in the illustrated embodiment a plurality of first members, annotated as 110-A, 110-B, 110-C, and 110-D are spaced about the inner circumference of the nacelle 108. A plurality of second members 126-A, 126-B, 126-C, and 126-D are spaced about the inner circumference of the flow splitter 106. The paired first members and second members may be formed as a unitary structure, or may be separate structures each coupled to the flow splitter 106.

As discussed in relation to previous figures, the fluid flowpath 145 of a heat management system of a propulsion unit 100 may flow from a radially interior cavity 125 through a second member 126-A, flow splitter 106, a first member 110-A, and into the nacelle cavity 129. The fluid flowpath 145 may then pass axially forward to the nacelle inlet leading edge 109, where it may comprise a heat exchanger 148. The heat exchanger 148 may pass about the full circumference of the nacelle inlet leading edge 109 (as shown in FIG. 7), or may be limited to discrete portions of the nacelle inlet leading edge 109 with those portions circumferentially spaced from each other. The fluid flowpath 145 may then pass axially aft to a first member 110-C, and may pass radially inward to return to the radially interior cavity 125 via a first member 110-C, flow splitter 106, and second member 126-C.

Thus, although the fluid flowpath 145 may pass through each of the plurality of first members 110 spaced circumferentially about the axis A, in some embodiments the fluid flowpath 145 passes through less than all of the plurality of first members 110 spaced circumferentially about the axis A. In some embodiments a subset of the plurality of members 110 spaced circumferentially about the axis A, such as first members 110-B and 110-D, do not contain a fluid flowpath.

As described above, the radially inward pass of the fluid flowpath 145 may include a first member inbound heat exchanger 152 and/or a second member inbound heat exchanger 506. In the illustration of FIG. 7, the fluid flowpath 145 begins at point 775 and ends at point 776, which each connect the fluid flowpath 145 to axially-extending conduit shown in the other cross-sectional views.

Figure 8:
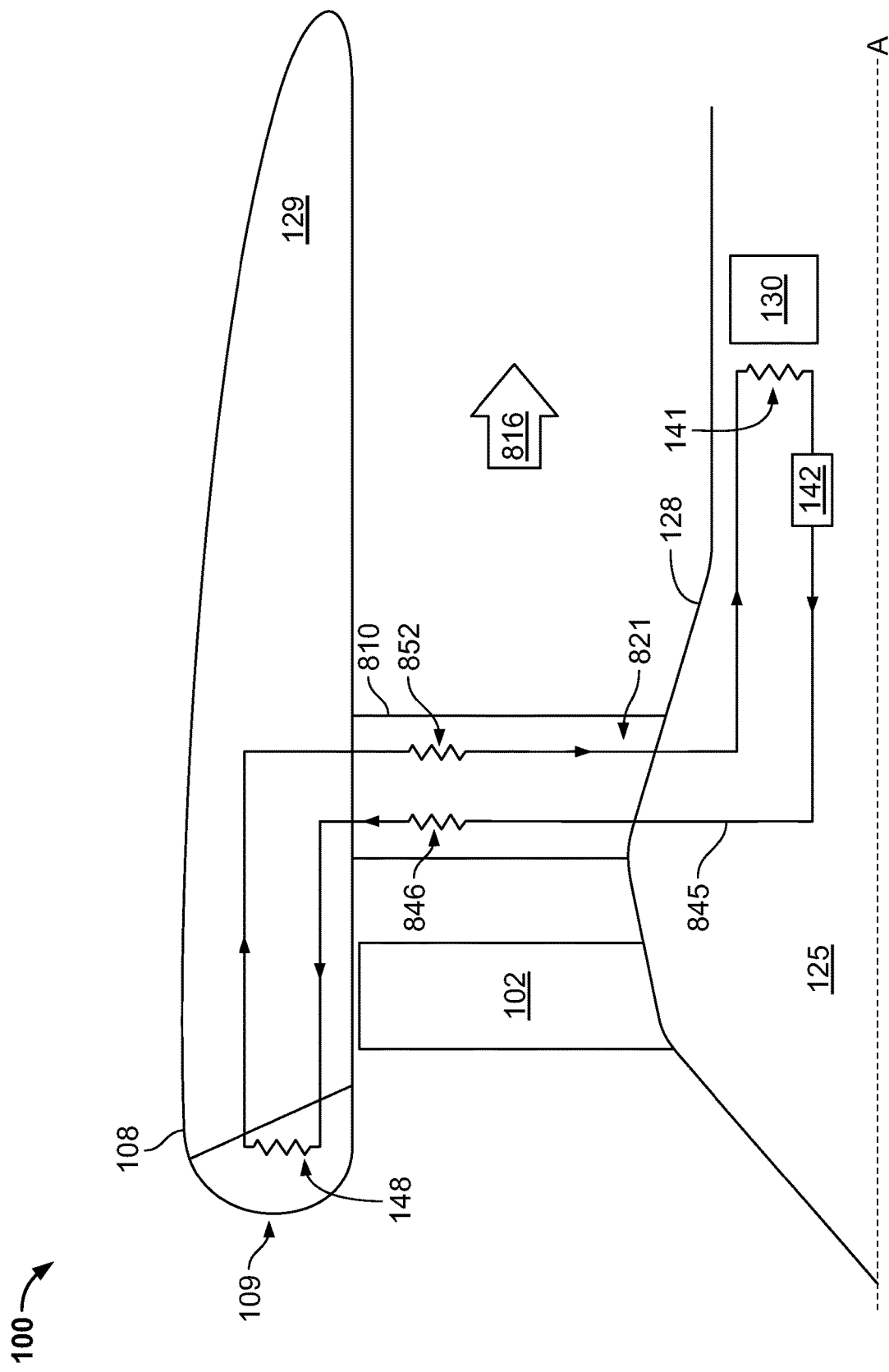
FIG. 8 is a simplified and schematic cross-sectional view of a portion of a propulsion unit in accordance with some embodiments of the present disclosure.

In some embodiments, the propulsion unit 100 may not include a flow splitter 106, such that all flow downstream of fan 102 is fan flow 816. FIG. 8 illustrates a simplified schematic cross-sectional view of such an embodiment. The propulsion unit 100 of FIG. 8 comprises a nacelle 108 radially outward of a static casing 128 that defines a radially interior cavity 125.

A first member 810 extends radially between the static casing 128 and the nacelle 108. The first member 810 may be one of a plurality of vanes spaced circumferentially about the axis A. The first member 810 defines an interior first member cavity 821. The first member 810 may be the outlet guide vanes of fan 102 or a fan strut.

A fluid flowpath 845 may extend from the radially interior cavity 125 to the nacelle cavity 129 via a first member cavity 821. The fluid flowpath 845 may include a first member outbound heat exchanger 846 and/or a first member inbound heat exchanger 852. Each of the heat exchangers 846 and 852 may be positioned to effect heat transfer between a cooling fluid of the fluid flowpath 845 and air flowing around the first member 810.

The fluid flowpath 845 may also comprise a heat exchanger 148 at the nacelle inlet leading edge 109. The heat exchanger may be positioned and/or configured to effect heat transfer between a cooling fluid of the fluid flowpath 845 and air flowing around the nacelle inlet leading edge 109.

In operation, cooling fluid is circulated through the fluid flowpath 845 by a pump 142. The cooling fluid passes through a heat exchanger 141 proximate the heat source 130 to effect heat transfer from the heat source 130 to the cooling fluid. The cooling fluid then passes through one or more of the first member outbound heat exchanger 846, heat exchanger 148 at the nacelle inlet leading edge 109, and/or the first member inbound heat exchanger 852 to effect transfer of heat from the cooling fluid to air flowing around the first member 810 and/or the nacelle inlet leading edge 109.

The systems and methods of the present disclosure provide numerous advantages over prior art cooling systems. Routing fluid through a first member cavity and downstream member cavity, with the members axially spaced from each other, increases the heat transfer area available to transfer heat from the fluid to the air passing over the members. The disclosed systems and methods allow high heat loads to be efficiently rejected to the atmosphere while employing existing engine structures such as first member, downstream member, and the nacelle to convey the heat to air flowing around those structures. The temperature of the fluid is unlikely to reach sufficiently high temperatures to degrade the integrity of any of these structures.

The use of a diverter valve to split the fluid into a first stream and second stream allows for optimizing the portion of the flow sent to the nacelle inlet leading edge and inlet region for de-icing purposes, and also allows for controlling the degree of temperature change in the fluid resulting from passing through the various heat exchangers and/or cavities. More or less fluid may be provided from the first member cavity to the downstream member cavity to achieve desired cooling and de-icing. Further, more or less fluid may be provided from first member cavity to downstream member cavity to achieve desired thrust benefits from heating of the bypass flow, with a preference for maximizing heat transfer to the bypass flow when possible.

Transferring heat from the cooling fluid to the air passing over the vanes additionally may improve engine performance by supplementing nozzle thrust. The provision of heat at the fan outlet guide vanes may also allow more thrust by increasing nozzle pressure.

Although some embodiments of the present disclosure are discussed as embodiments of a heat management system for a turbofan engine, the present disclosure is equally applicable to a fan propulsion unit or a propeller propulsion unit and is therefore not limited to turbofan engines.

Although some embodiments of the present disclosure include a flow splitter 106, the present disclosure is equally applicable to fan propulsion units lacking a flow splitter, as illustrated and discussed with reference to FIG. 8. Each of the embodiments disclosed herein may be implemented in a propulsion unit absent a flow splitter, such as a fan propulsion unit.

Although the embodiments of the present disclosure are discussed as heat management systems and fluid flowpaths applied to propulsion systems such as a fan propulsion unit and a turbofan engine, the present disclosure is equally as applicable to electrical machines such as an electrical generator that produces no thrust. The heat management systems disclosed herein are thus applicable to electrical power systems for supplying high loads such as, for example, an electrical power system for auxiliary or mission power systems.

Although examples are illustrated and described herein, embodiments are nevertheless not limited to the details shown, since various modifications and structural changes may be made therein by those of ordinary skill within the scope and range of equivalents of the claims.

What is claimed is:

1. A propulsion system comprising:
a rotatable shaft defining an axis of rotation;
a static casing positioned radially outward of the shaft, said casing at least partially defining a radially interior cavity;
a fan coupled to the rotatable shaft;
a static nacelle positioned radially outward of the fan and extending axially along at least a portion of the axis of rotation, said static nacelle defining an interior nacelle cavity and having a nacelle inlet leading edge;
a static flow splitter positioned radially intermediate of at least a portion of the static nacelle and the shaft;
a first radially extending member positioned along the axis of rotation and extending radially between the static flow splitter and the static nacelle, said first radially extending member defining an interior first member cavity;
a second radially extending member positioned along the axis of rotation and extending radially between the casing and the static flow splitter, said second radially extending member defining a second member cavity;
a downstream radially extending member axially disposed downstream of the first radially extending member, said downstream radially extending member defining a downstream member cavity extending from the static flow splitter to the static nacelle; and
a heat management system comprising a fluid flowpath for conveying a fluid, said fluid flowpath extending from the radially interior cavity to the interior nacelle cavity via the interior first member cavity and the second member cavity, extending from the interior nacelle cavity to the static flow splitter via the downstream member cavity, returning to the interior nacelle cavity from the flow splitter through the downstream member cavity, and returning to the radially interior cavity from the interior nacelle cavity via the first radially extending member and the second radially extending member.

2. The propulsion system of claim 1 wherein said fluid flowpath further comprises a heat exchanger positioned in the downstream member cavity to effect heat transfer from the fluid to air flowing around the downstream radially extending member.

3. The propulsion system of claim 1 wherein said fluid flowpath further comprises a heat exchanger disposed in the second member cavity to effect heat transfer from the fluid to air flowing around the second radially extending member.

4. The propulsion system of claim 1 further comprising a diverter valve for controlling a flow of the fluid to a heat exchanger disposed in the second member cavity.

5. The propulsion system of claim 1 further comprising a pump disposed in the fluid flowpath.

6. The propulsion system of claim 1 wherein the fluid flowpath further comprises a heat exchanger positioned at the nacelle inlet leading edge to effect heat transfer from the fluid to air flowing around the nacelle inlet leading edge.

7. The propulsion system of claim 6 further comprising a diverter valve in the fluid flowpath, the diverter valve adjustable to control a flow rate of the fluid flowing to the heat exchanger positioned at the nacelle inlet leading edge by diverting the fluid into a first stream to the heat exchanger and a second stream that bypasses the heat exchanger.

8. The propulsion system of claim 7 further comprising a merge pipe junction in the fluid flowpath, said first stream and said second stream merging at the merge pipe junction.

9. The propulsion system of claim 1 wherein the fluid conveyed in the fluid flowpath is a two-phase coolant.

10. The propulsion system of claim 1 further comprising a heat source, wherein the fluid flow-path is configured to pass the fluid proximate to the heat source to effect heat transfer from the heat source to the fluid.

11. The propulsion system of claim 10, wherein the heat source is an electric machine coupled to the rotatable shaft.

12. The propulsion system of claim 10, wherein the heat source is positioned in the radially interior cavity.

13. The propulsion system of claim 1, wherein the fluid flowpath further comprises a heat exchanger disposed in the interior first member cavity to effect heat transfer from the fluid to air flowing around the first radially extending member.

14. The propulsion system of claim 6, wherein the heat exchanger positioned at the nacelle inlet leading edge is configured to de-ice the nacelle inlet leading edge.

15. The propulsion system of claim 1 wherein the first radially extending member comprises a plurality of first radially extending members spaced circumferentially about the axis of rotation.

* * * * *